(12) United States Patent
Heiles (10) Patent No.: US 6,937,275 B2
(45) Date of Patent: Aug. 30, 2005

(54) CONTACT SHEET FILE-GENERATING DIGITAL CAMERA

(75) Inventor: Lainye E Heiles, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 650 days.

(21) Appl. No.: 10/027,687

(22) Filed: Dec. 20, 2001

(65) Prior Publication Data

US 2003/0117502 A1 Jun. 26, 2003

(51) Int. Cl.$^7$ ................................................ H04N 5/76
(52) U.S. Cl. .............................. 348/231.2; 348/231.3
(58) Field of Search ........................... 348/231.2, 207.1, 348/333.01, 333.11, 333.12, 333.05, 207.2, 333.02, 333.03

(56) References Cited

U.S. PATENT DOCUMENTS

| | | | |
|---|---|---|---|
| 5,164,831 A | | 11/1992 | Kuchta et al. |
| 5,706,457 A | * | 1/1998 | Dwyer et al. ............... 715/835 |
| 5,767,945 A | * | 6/1998 | Fields et al. ................. 355/39 |
| 6,195,513 B1 | | 2/2001 | Nihei et al. |
| 6,201,571 B1 | | 3/2001 | Ota |
| 6,215,523 B1 | | 4/2001 | Anderson ............. 348/330.05 |
| 6,603,506 B2 | * | 8/2003 | Ogawa et al. ........... 348/207.2 |
| 6,674,472 B1 | * | 1/2004 | Tsutsui .................. 348/333.05 |
| 6,771,896 B2 | * | 8/2004 | Tamura et al. ................ 396/57 |
| 6,784,925 B1 | * | 8/2004 | Tomat et al. .......... 348/207.11 |
| 2001/0002845 A1 | | 6/2001 | Tamashima ................. 348/220 |
| 2001/0013949 A1 | | 8/2001 | Tateyama .................. 358/1.16 |
| 2002/0063781 A1 | * | 5/2002 | Aizawa ...................... 348/211 |

FOREIGN PATENT DOCUMENTS

| | | | |
|---|---|---|---|
| EP | 0837405 | 4/1998 | |
| JP | 2000287110 | 10/2000 | .......... H04N/5/225 |
| JP | 2000287162 | 10/2000 | |

OTHER PUBLICATIONS

European Search Report for Application No. 02258301.

* cited by examiner

*Primary Examiner*—Wendy R. Garber
*Assistant Examiner*—Nelson D Hernandez (57) ABSTRACT

A digital camera that generates contact file sheets is disclosed. The digital camera includes a picture-taking mechanism and a contact sheet generation mechanism. The picture-taking mechanism takes pictures by generating image files corresponding to the pictures. The contact sheet generation mechanism generates one or more contact sheet files. Each contact sheet file includes a number of thumbnail images. Each thumbnail image corresponds to one of the image files.

21 Claims, 8 Drawing Sheets

CONTACT SHEET FILE-GENERATING DIGITAL CAMERA

BACKGROUND OF THE INVENTION

Digital cameras have recently become popular with both home and business users, as they have come down in price, and as users have gained experience with them. A digital camera generally varies from a regular camera in that instead of taking pictures on film that must be developed, it takes pictures that are saved as image files within the camera. The image files may be saved on internal memory of the digital camera, or on a removable memory card or other computer-readable media that can be removed from the camera and inserted into a corresponding slot of a computer or a device attached to the computer. The image files are thus usually uploaded to a computer, where the user may manipulate them, and ultimately may print them on a printer.

Digital cameras generally have some advantages over regular film cameras. One advantage is that the user may have the opportunity to preview the pictures taken on a small screen of the screen. If a picture is not desired, the user can then easily delete the picture, freeing up the memory for taking additional pictures, if the camera uses erasable memory to store the image files. Furthermore, memory cards or other computer-readable media usually allow for a larger number of pictures to be taken than a typical roll of film does. This enables the user to take a large number of pictures, which can later be culled down to a more reasonable number for printing or exchanging with others, such as via email or a computer disk or other media.

However, the large number of pictures that can be taken by a digital camera presents its own set of problems. In some cases, uploading the pictures from the digital camera to a computer may be a slow process, and may require a large portion of the computer's storage. Once the pictures are uploaded to the computer, the user also loses the concept of a "roll" of film in which pictures are logically grouped according to the event or time period in which the pictures were taken. Furthermore, printing the pictures can be a slow process that may take hours if there are a large number of pictures to print, especially if the user is using a consumer-oriented color inkjet printer. Where the user wishes to exchange pictures with others, emailing or otherwise transferring the pictures electronically can also be a slow process that requires individual attachment of each picture to send, and exceedingly slow where the user only has a telephone modem network connection and not a broadband network connection. In addition, many mail servers exclude large files, which digital image files often are.

Deciding which pictures to upload, print, or exchange may therefore be desirable to the user before starting one of these processes. The user may examine the pictures one by one on the small screen of the camera to decide which pictures to actually upload to the computer. However, this can be disadvantageous, because the small screen is an inconvenient display device on which to view pictures, and is a relatively low image-quality device on which to view pictures. The user may also examine the pictures one by one on the screen of the computer after uploading them, to determine which pictures to print or exchange. This may entail a time consuming and laborious process of opening each picture individually in a photo-viewing computer program. In the case of printing, the color fidelity of the screen of the computer may be different or worse than that of the printer. In the case of exchanging pictures, the user may not know which pictures the person to whom he or she is sending the pictures actually wants.

For these and other reasons, there is a need for the present invention.

SUMMARY OF THE INVENTION

The invention may be embodied in a digital camera that generates contact file sheets. The digital camera includes a picture-taking mechanism and a contact sheet generation mechanism. The picture-taking mechanism takes pictures by generating image files corresponding to the pictures. The contact sheet generation mechanism generates one or more contact sheet files. Each contact sheet file includes a number of thumbnail images. Each thumbnail image corresponds to one of the image files. Still other aspects and embodiments of the invention will become apparent by reading the detailed description of the invention, and by referring to the accompanying drawings.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Contact Sheet Files

Figure 1:
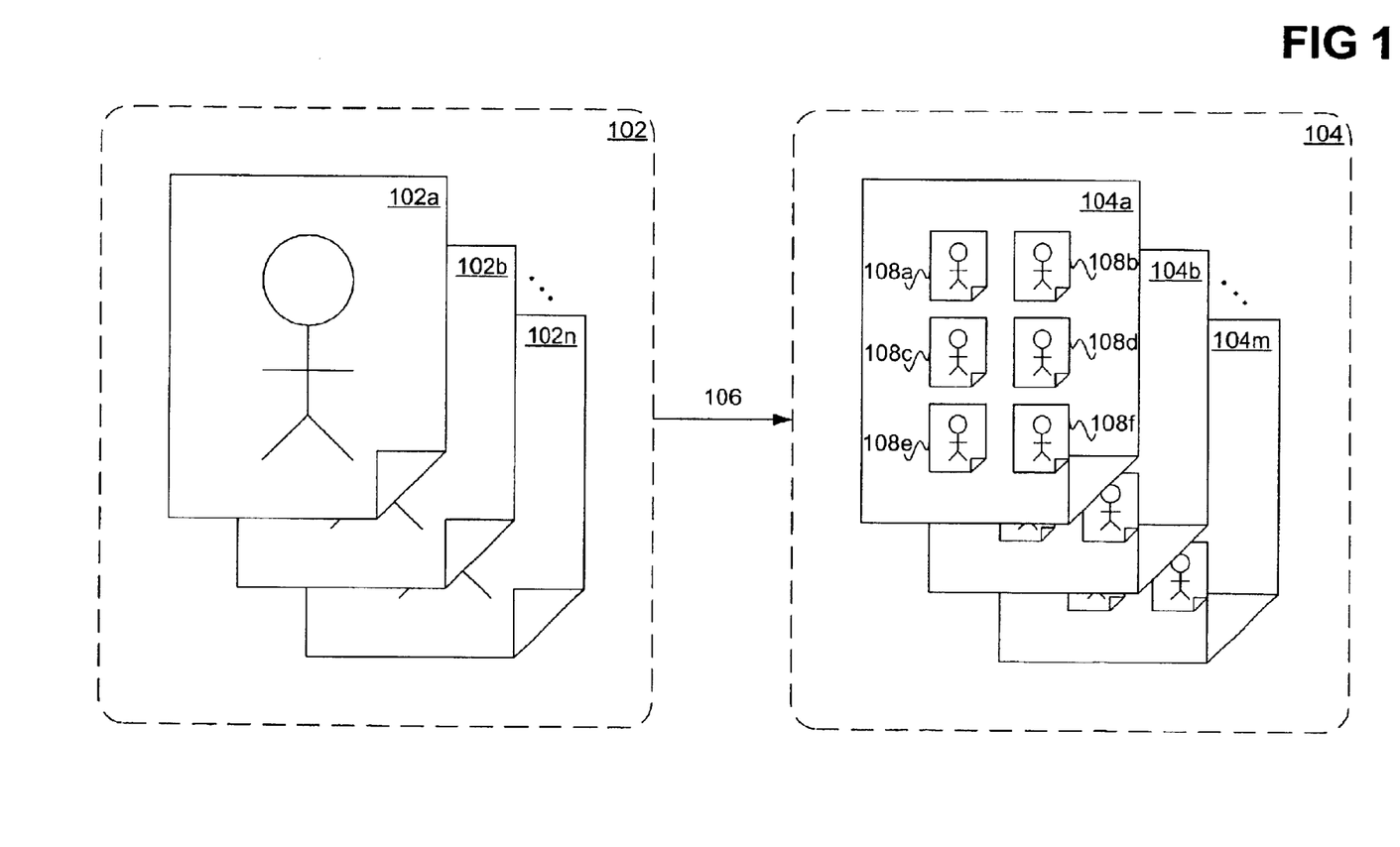
FIG. 1 is a diagram showing an example of contact sheet files that have thumbnail images and that can be generated by a digital camera, according to an embodiment of the invention.

FIG. 1 shows an example of contact sheet files having thumbnail images that can be generated by digital cameras, according to an embodiment of the invention. The user takes a number of pictures using a digital camera, which generates image files 102 corresponding to the pictures. The image files 102 may be according to a file format, such as the JPEG file format, or another file format. The image files 102 include a number of images 102a, 102b, . . . , 102n. Copies of the images of the image files 102 are reduced in size, such as in terms of the number of pixels in either the x and/or y directions, and a number of these reduced-in-size images are stored together in new image files called contact sheet files 104, as indicated by the arrow 106.

The contact sheet files 104 include a number of contact sheet files 104a, 104b, . . . , 104n. Each of the contact sheet files 104 has a number of the reduced-in-size images corresponding to the image files 102. For example, the contact sheet file 104a has six such images, the images 108a, 108b, 108c, 108d, 108e, and 108f. The number of images per each of the contact sheet files 104 may be more or less than this number, however. The size of the contact sheet files 104 may be the same size as the image files 102, in terms of the number of pixels in either the x and/or y directions, and so on. Furthermore, the file format of the contact sheet files 104 may also be the JPEG file format, or another file format.

The number of contact sheet files 104 is the number of image files 102, divided by the number of images that can fit on each of the contact sheet files 104, rounded up. For example, where six images fit on each contact sheet file, if there are twenty image files, then there are four contact sheet files. This is because twenty divided six is three and one-third, which rounded up is four.

A contact sheet is generally and non-restrictively defined as a sheet containing a number of reduced-in-size images. The sheet is often used to select individual images for printing. The reduced-in-size images can be referred to as contact images, or thumbnail images. A thumbnail image itself is generally and non-restrictively defined as a small image representation of a larger image. Thumbnail images on a contact sheet, therefore, usually make it easier and faster to view or manage a group of larger images.

The reduced-in-size, or thumbnail, images that constitute each of the contact sheet files 104 are preferably not separate image files, but rather are part of a single image file that is the contact sheet file. For example, the images 108a, 108b, 108c, 108d, 108e, and 108f are preferably not separate image files that the contact sheet file 104a refers to in a hyperlink or other manner. Rather, the images 108a, 108b, 108c, 108d, 108e, and 108f are preferably part of a single image file that is the contact sheet file 104a. This is why contact sheets are preferably referred to herein as files, since they correspond to files, and the thumbnail images they contain are not referred to herein as files, since they do not correspond to individual files. Furthermore, the contact sheet files are preferably persistent, in that once they are generated, they are stored in the digital camera, allowing them to be uploading to another device, such as a host computer. The contact sheet files are further continually updated as image files representing pictures are added or deleted.

In this way, the contact sheet file 104a, as well as the other of the contact sheet files 104, can be uploaded from the digital camera no differently than any of the image files 102. Because each of the contact sheet files 104 includes a number of thumbnail images that correspond to a number of the image files 102, a user only has to download, print, exchange, or otherwise process, one such contact sheet file to receive an approximation of a number of image files. The user can then determine which image files to actually download, print, exchange, or otherwise process, based on the images shown in the contact sheet file.

The contact sheet files 104 may also each contain textual information in addition to the images corresponding to the image files 102. Each thumbnail image of the contact sheet file may have nearby or thereon the name of the image file to which the thumbnail image corresponds, as well as the date and/or time the picture to which this image file corresponds was taken. User-entered information, such as indicating what the subject matter of this picture is, may also appear near or on the thumbnail image. Identifying information regarding the digital camera itself can further appear on each contact sheet file. Other types of textual and other information can also be included on each contact sheet file.

Furthermore, the contact sheet files 104 may be generated dynamically or in response to an event. Dynamic generation of the contact sheet files 104 means that, as the image files 102 are generated as a result of pictures being taken by the user, the contact sheet files 104 are updated to include thumbnail images corresponding to the new image files taken, and to add new contact sheet files as needed. Furthermore, the contact sheet files 104 are updated as the image files 102 are selectively deleted, or removed, by the user from the digital camera. Alternatively, the contact sheet files 104 may be generated in response to an event, such as a user command to generation these files, when the image files 102 are being uploaded from the digital camera, and so on.

Method for Generating Contact Sheet Files

Figure 2:
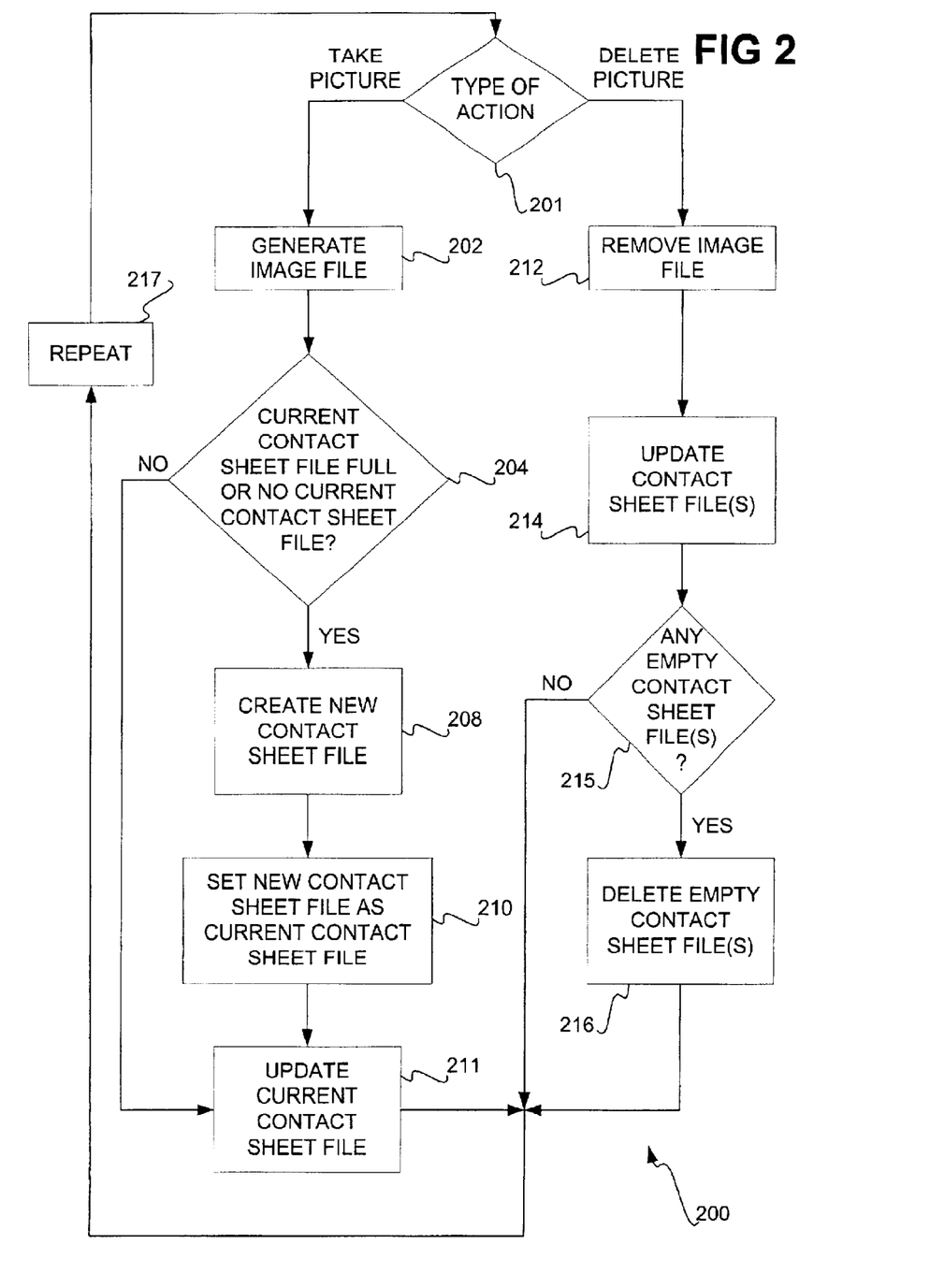
FIG. 2 is a flowchart of a method for generating contact sheet files with a digital camera, according to an embodiment of the invention, upon the generation and/or removal of image files corresponding to pictures taken with digital camera.

FIG. 2 shows a method 200 for generating contact sheet files according to an embodiment of the invention. The method 200 is preferably performed by a digital camera, and the contact sheet files are generated to include thumbnail images of the image files corresponding to pictures taken with the digital camera. The method 200 shows the different functionality that can be performed in conjunction with generating contact sheet files. However, the steps or acts of the method 200 do not necessarily reflect the order in which a user may take pictures with or remove image files from the digital camera, such that other embodiments of the invention may not include all the steps or acts indicated in FIG. 2, and/or other embodiments may perform the steps or acts in a different order.

At least two basic types of actions can be performed by the digital camera (201). First, in response to the digital camera taking a picture, an image file corresponding to the picture is generated (202). If there is no current contact sheet file, or if the current contact sheet file is full (204), then a new contact sheet file is created (208), and set as the current contact sheet file (210). The current contact sheet file is then updated to include a thumbnail image corresponding to the image file (211), which is also performed where there is a current contact sheet file that is not full (204). The current contact sheet file is preferably a contact sheet file that is not completely filled with thumbnail images. Thus, as more pictures are taken, generating more image files, new thumbnail images corresponding to these additional image files are added to the current contact sheet.

Figure 3:
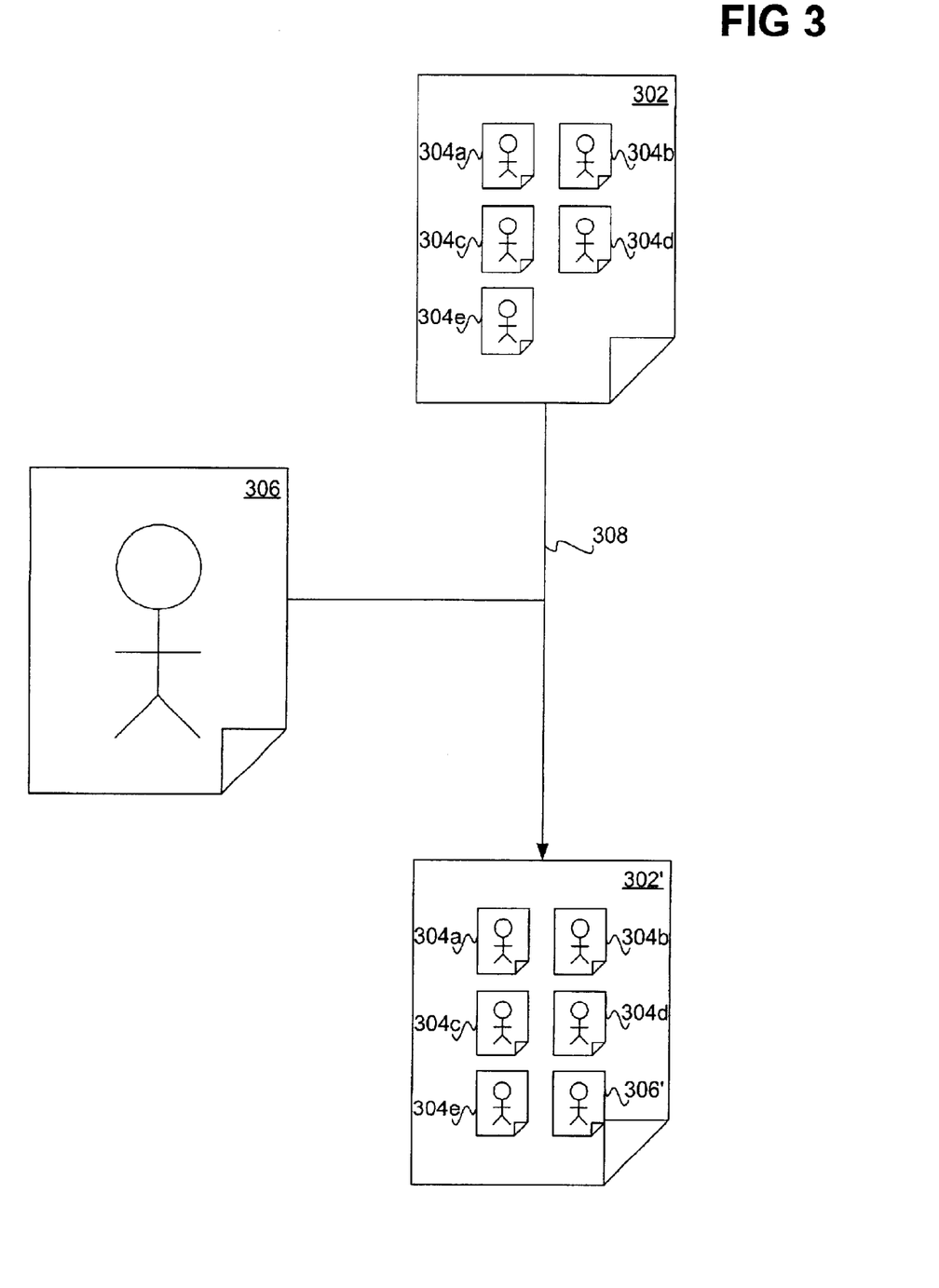
FIG. 3 is a diagram illustratively showing the generation of an image file corresponding to a picture taken with a digital camera, and the resulting addition of a thumbnail image corresponding to the image file to a current contact sheet file, according to an embodiment of the invention.

FIG. 3 shows illustratively an example of the generation of an image file and the updating of the current contact sheet file to include a thumbnail image corresponding to the image file. A current contact sheet file 302 includes thumbnail images 304*a*, 304*b*, 304*c*, 304*d*, and 304*e*. There are thus five thumbnail images in the current contact sheet file 302, and the current contact sheet file 302 can show a maximum of six thumbnail images. A picture is taken with the digital camera, leading to the generation of the image file 306 that corresponds to this picture. As indicated by the arrow 308, the current contact sheet file 302 is updated to include a thumbnail image corresponding to the image file 306. The updated current contact sheet file is indicated as the current contact sheet file 302'. It still has the thumbnail images 304*a*, 304*b*, 304*c*, 304*d*, and 304*e*, but now also has the thumbnail image 306', which is a thumbnail image corresponding to the image file 306.

Figure 4:
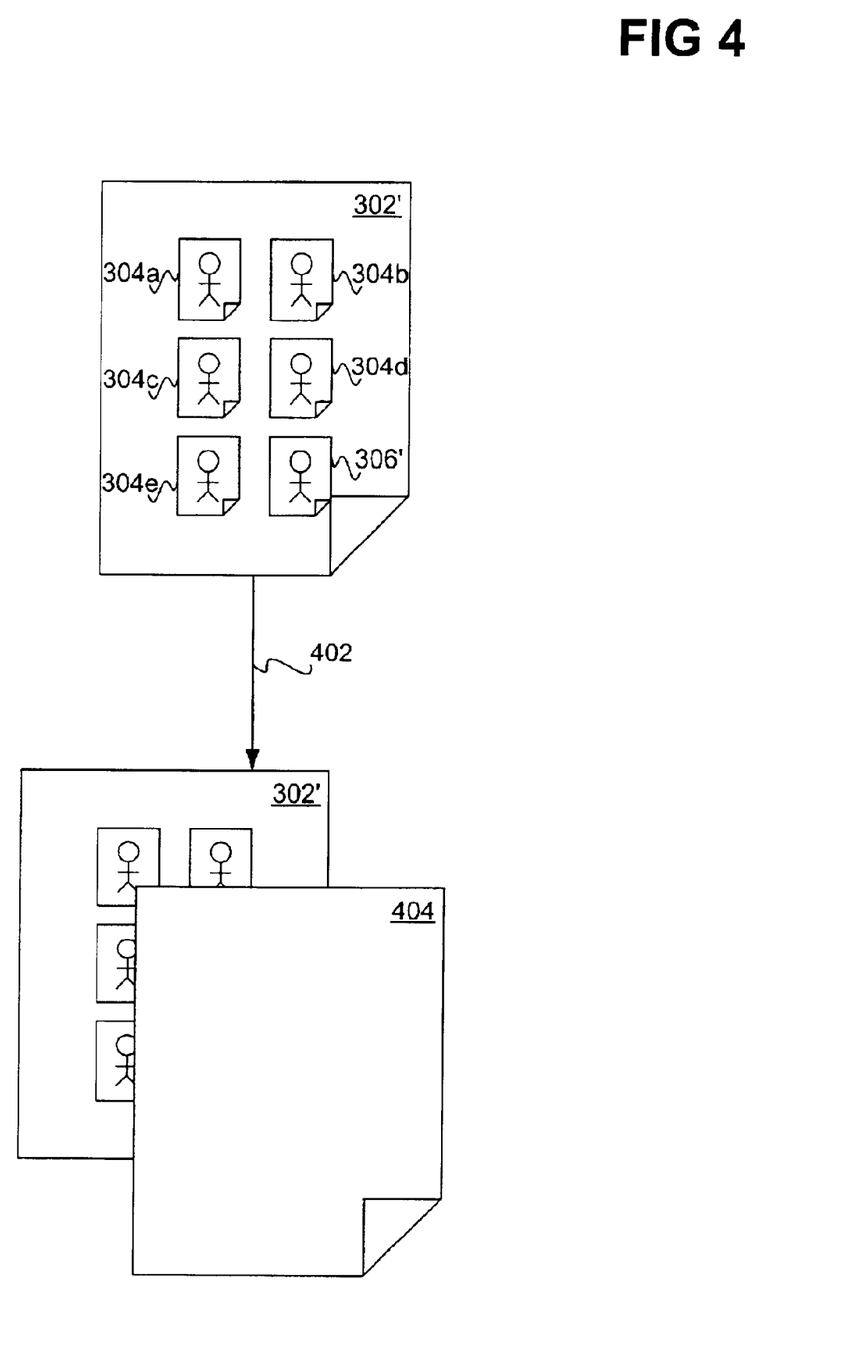
FIG. 4 is a diagram illustratively showing the creation of a new contact sheet file when the current contact sheet file contains its maximum number of thumbnail images, and the setting of the new contact sheet file as the current contact sheet file, according to an embodiment of the invention.

FIG. 4 shows illustratively an example of a current contact sheet file having the maximum number of thumbnail images, resulting in the creation of a new contact sheet file as the current contact sheet file. The current contact sheet file 302', as has been indicated, has the thumbnail images 304*a*, 304*b*, 304*c*, 304*d*, 304*e*, and 306'. It therefore has six thumbnail images, which is the maximum number of thumbnail images the contact sheet file 302' can hold. Therefore, as indicated by the arrow 402, a new contact sheet file 404 is created. This new contact sheet file 404 is set as the current contact sheet file, so that new thumbnail images are added to the contact sheet file 404.

Furthermore, referring back to FIG. 2, the other basic type of action is a picture being deleted from the digital camera (201). Therefore, the image file corresponding to this picture is removed (212). Image files may be deleted from the digital camera because, for example, the user has decided that the pictures to which the image files correspond did not come out as intended, that he or she does not want to keep these pictures due to decreasing available storage in the digital camera for new pictures, and so on. Removal of the image files may also result when the user uploads from the image files from the digital camera to another device, such as a host computer, resulting in their removal from the camera.

Once these image files are removed, or deleted, then the contact sheet(s) that have been so far created, including the current contact sheet, are correspondingly updated to remove the thumbnail images corresponding to the removed image files (214). The terms removal and deletion are used synonymously herein. Next, the method 200 determines whether there are any empty contact sheet files after updating the contact sheet files (215). If so, then these empty contact sheet files are deleted (216).

Figure 5:
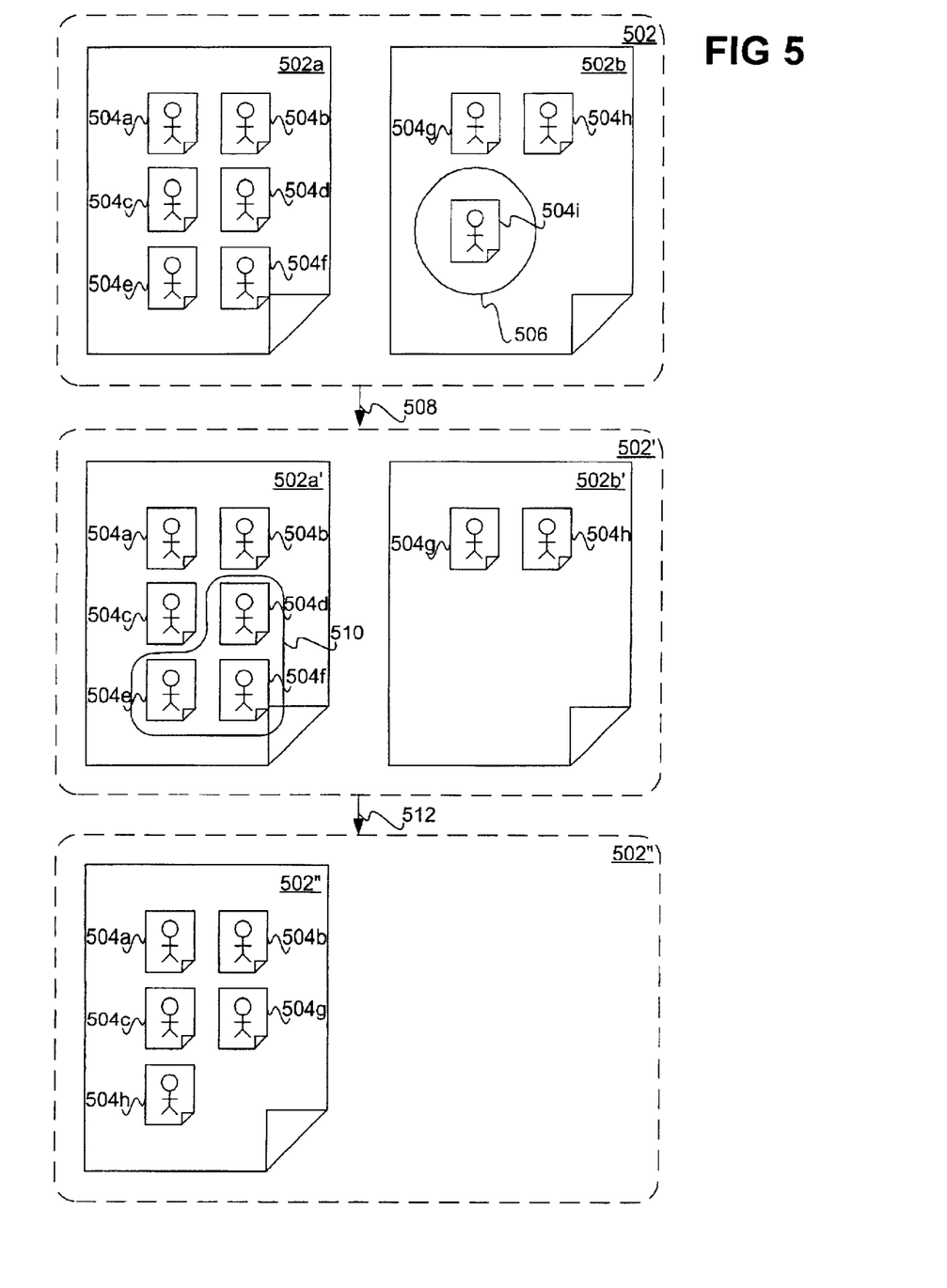
FIG. 5 is a diagram illustratively showing the removal of image files from a digital camera, resulting in the removal of thumbnail images corresponding to the image files from contact sheet files, according to an embodiment of the invention.

FIG. 5 shows illustratively two examples of the removal of image files and the resulting updating of the contact sheet files as a result. Initially, there are contact sheet files 502, including a contact sheet file 502*a*, and a contact sheet file 502*b*. The contact sheet file 502*b* is the current contact sheet file, because it has space for new thumbnail images to be added thereto. The contact sheet file 502*a* has thumbnail images 504*a*, 504*b*, 504*c*, 504*d*, 504*e*, and 504*f*, whereas the contact sheet file 502*b* has thumbnail images 504*g*, 504*h*, and 504*i*. The thumbnail image 504*i* is circled with the loop 506 to indicate that the user has deleted the image file to which the thumbnail image 504*i* corresponds.

Therefore, the thumbnail image 504*i* also is deleted, as indicated by the arrow 508. This results in the contact sheet files 502', including the contact sheet file 502*a'* and the contact sheet file 502*b'*. The contact sheet file 502*a'* has not changed from the contact sheet file 502*a*, and still includes thumbnail images 504*a*, 504*b*, 504*c*, 504*d*, 504*e*, and 504*f*.

However, the contact sheet file 502*b'* is changed from the contact sheet file 502*b*, in that it now only includes the thumbnail images 504*g* and 504*h*. The contact sheet file 502*b'* is still the current contact sheet file. Next, the thumbnail images 504*d*, 504*e*, and 504*f* are circled with the loop 510 to indicate that the user has removed the image files to which these thumbnail images correspond.

Therefore, the thumbnail images 504*d*, 504*e*, and 504*f* are correspondingly removed, as indicated by the arrow 512. This results in the contact sheet files 502", which now only includes the contact sheet file 502*a"*. The contact sheet file 502*a"* includes the thumbnail images 504*a*, 504*b*, 504*c*, 504*g*, and 504*h*, where the latter two thumbnail images were moved over from the contact sheet file 502*b'*, since space became available in the contact sheet file 502*a"* after deletion of the thumbnail images 504*d*, 504*e*, and 504*f*. Furthermore, the contact sheet file 502*a"* has space for one more thumbnail images, so it is now set as the current contact sheet file. There is no more need for a second contact sheet file.

Referring back to FIG. 2, the method 200 can repeat, in an event-driven or other manner (217). For example, the method 200 proceeds back to 201, where it awaits another action, such as a picture being taken or deleted, to be performed with the digital camera. The method 200 as has been described is dynamic in that as image files are generated by or removed from the digital camera, the contact sheet files are updated to reflect the newly added or removed image files. However, as has been noted, this updating process may also be static, and performed in response to an event. For example, the updating of the contact sheet files in 211 and 214 of the method 200 may only be performed at the user's command, or when the image files are to be uploaded to another device. That is, the updating of the contact sheet files in 211 and 214 may not be performed each time image files are added or removed, respectively.

Digital Camera and Computer Program

Figure 6:
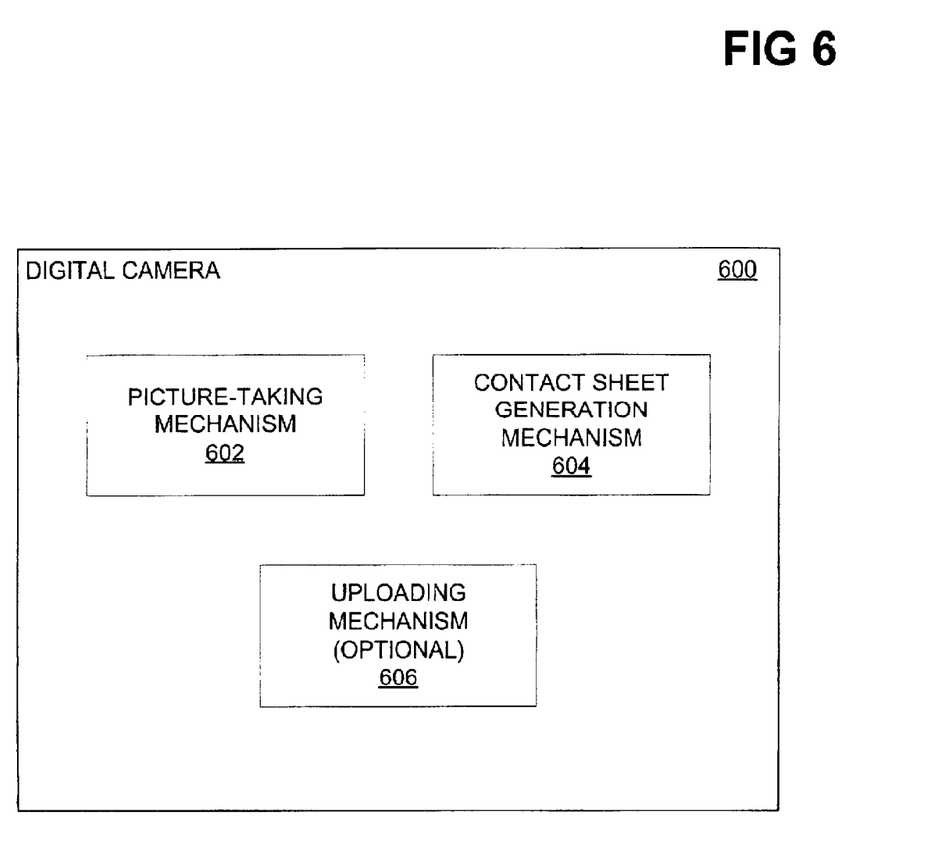
FIG. 6 is a block diagram of a digital camera that generates contact sheet files, according to an embodiment of the invention.

FIG. 6 shows a block diagram of a digital camera 600 according to an embodiment of the invention. Only those parts that are needed to implement this embodiment of the invention are shown in FIG. 6. However, as can be appreciated by those of ordinary skill in the art, the digital camera 600 may typically have other parts, and/or the parts shown in FIG. 6 may have sub-parts, for proper implementation and operation of the digital camera 600. Furthermore, the previous embodiments of the invention that have been described can be implemented in conjunction with and can relate to the digital camera 600. The digital camera 600 specifically has a picture-taking mechanism 602, a contact sheet generation mechanism 604, and an optional uploading mechanism 606. Each of the mechanisms 602, 604, and 606 may be hardware, software, or a combination of hardware and software.

The picture-taking mechanism 602 is for the digital camera 600 to take pictures, by generating image files corresponding to the pictures. The mechanism 602 may also be referred to as a first mechanism. The contact sheet generation mechanism 604 generates one or more contact sheet files. Each contact sheet file includes a number of thumbnail images, where each thumbnail image corresponds to one of the image files. The contact sheet generation mechanism 606 may be referred to as a second mechanism. Finally, the optional uploading mechanism 606 uploads the image files, as well as the one or more contact sheet files, to another device, such as a host computer, a storage device, a printer, and so on. The uploading mechanism 606 may be referred to as a third mechanism. The uploading mechanism 606 is optional in that, for example, the image files and the contact sheet files may be stored on a removable memory card in the digital camera 600. Uploading of the files to another device may thus alternatively be accomplished by removing the card from the camera 600, and inserting it into the other device, or a memory card reader communicatively coupled to the other device.

Figure 7:
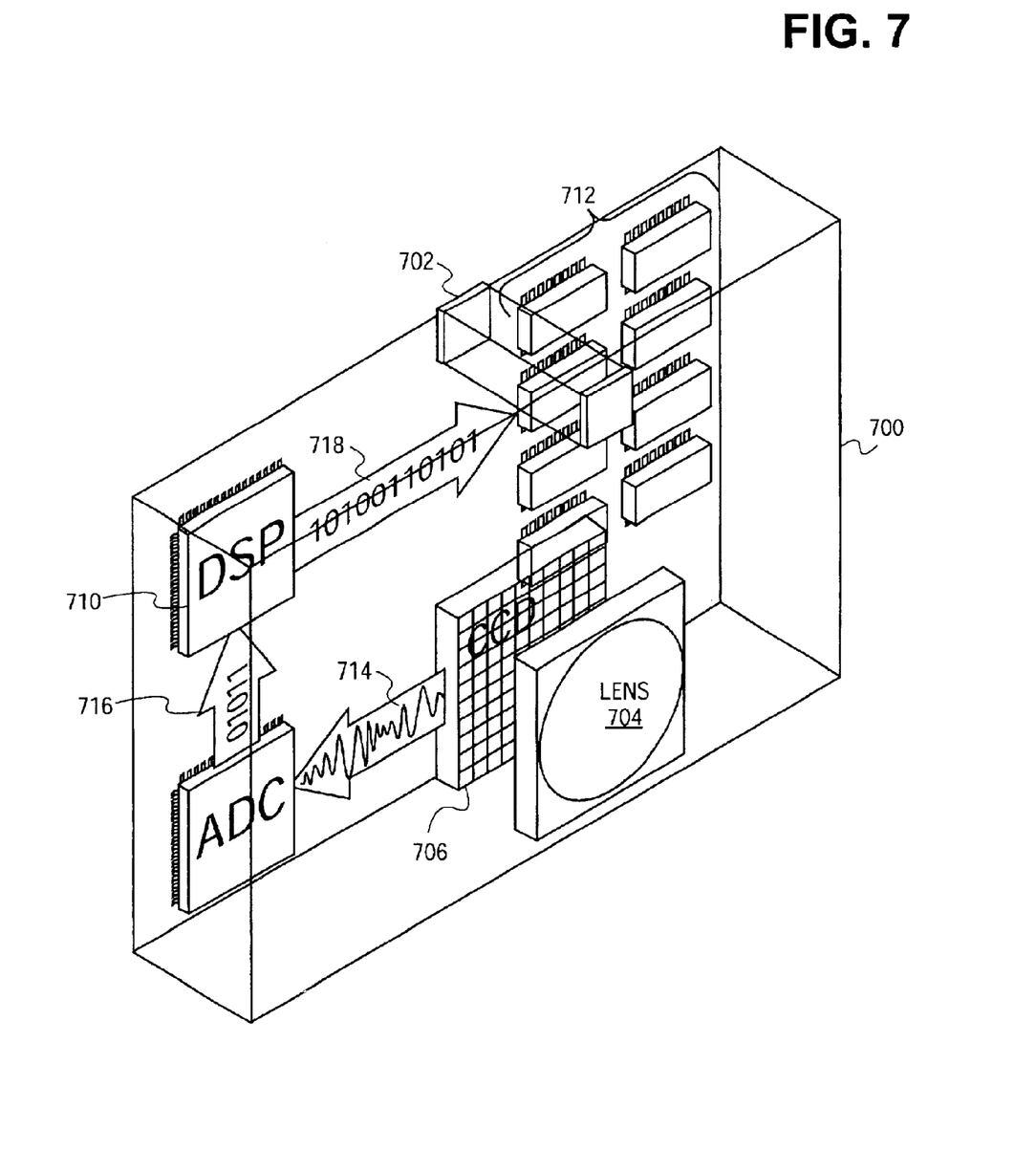
FIG. 7 is a diagram of an example digital camera, in conjunction with which embodiments of the invention may be implemented.

FIG. 7 shows an example of a typical digital camera 700 in conjunction with which embodiments of the invention can be implemented. The digital camera 600 of FIG. 6, for example, may be implemented as including at least some of the parts of the digital camera 700 of FIG. 7. The digital camera 700 includes a viewfinder 702, a lens 704, a charge-coupled device (CCD) 706, an analog-to-digital converter (ADC) 708, a digital signal processor (DSP) 710, and memory 712.

A user views an image through the viewfinder 702, and then causes the digital camera 704 to record a desired picture of the image as an image file, using a mechanism not particularly shown in FIG. 7. Light from the image goes through the lens 704, where the CCD 706 records analog intensities of red, green, and blue light of the image as variable charges. The resolution of the CCD 706 determines the resolution of the digital camera 700. The ADC converter 708 converts these analog intensities to digital data according to a color depth measured in bits, as indicated by the arrow 714.

Furthermore, the DSP 710 can be used to adjust contrast and detail of the of the image file, and also compresses the digital data according to a file format such as JPEG, as indicated by the arrow 716. As indicated by the arrow 718, the DSP 710 stores the digital data as an image file corresponding to the picture taken in the memory 712. The memory 712 is shown as permanent, hard-wired storage within the camera 700. However, it may also be removable storage.

Figure 8:
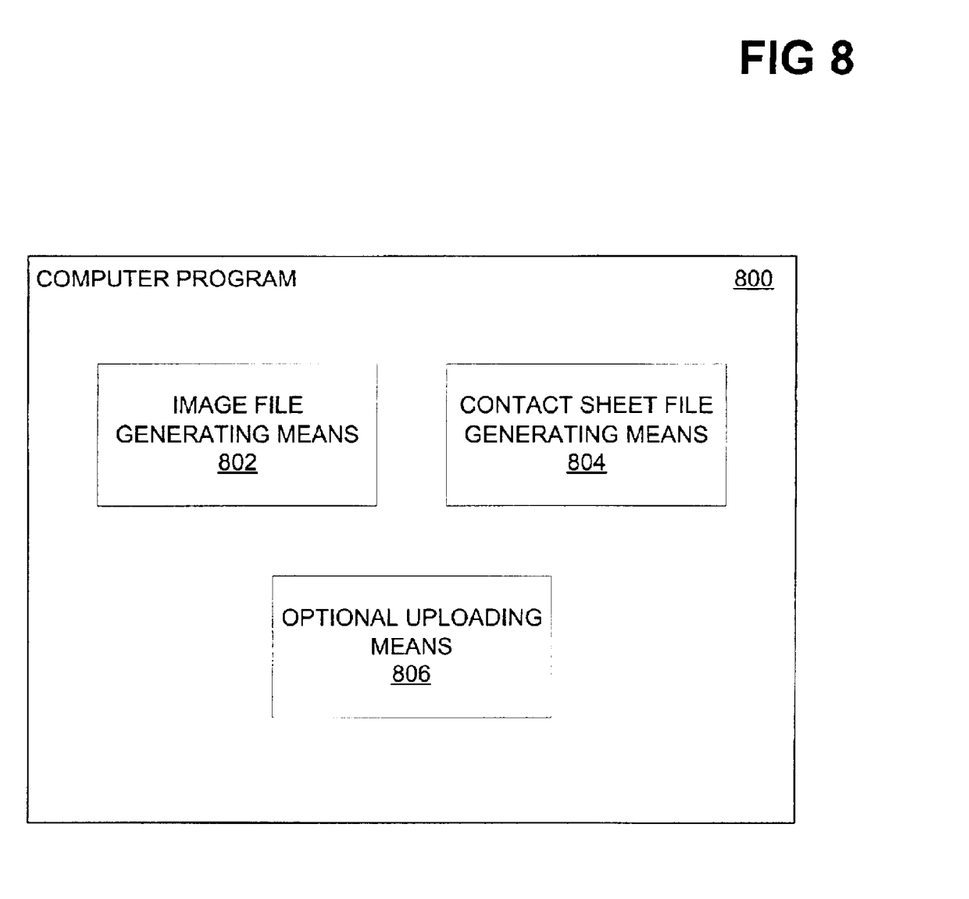
FIG. 8 is a block diagram of a computer program that may be included in a digital camera and that generates contact sheet files, according to an embodiment of the invention.

FIG. 8 shows a computer program 800 for performance by a digital camera, according to an embodiment of the invention. The program 800 is more specifically a set of instructions that can be stored on a computer-readable medium, for execution by a digital camera, such as a processor of the camera. The computer-readable medium may be, for instance, a read-only memory (ROM). The previous embodiments of the invention that have been described can be implemented in conjunction with and can relate to the computer program 800. The program 800 specifically includes an image file generation means 802, a contact sheet file generation means 804, and an optional uploading means 806. Each of the means 802, 804, and 806 can be implemented as a sub-set of the computer instructions stored on the computer-readable medium.

The image file generation means 802 is for generating image files corresponding to pictures taken with the digital camera. These image files may be referred to as first image files. The contact sheet file generation means 804 is for generating contact sheet files. Each contact sheet file has a number of thumbnail images, where each thumbnail image corresponds to one of the first image files. The contact sheet files may be referred to as second image files, and the thumbnail images may be referred to as reduced-in-size images. Finally, the optional uploading means 806 is for uploading the first and the second image files to another device.

Conclusion

At least some embodiments of the invention provide for advantages not found within the prior art. The contact sheet files generated by an embodiment of the invention can be uploaded to a computer no differently than any other image file generated by the digital camera. The user may initially only upload the contact sheet files to the computer, and from viewing the contact sheet files on the display of the computer, decide which pictures to actually upload to the computer. The user may also initially print only the contact sheet files to decide which pictures to actually print. This provides the advantage of sharing a hard copy of the "roll" of film—i.e., a group of image files taken with a digital camera—with others without having to print out the image files individually.

Furthermore, the user may first exchange the contact sheet files with another user, so that this other user can decide for him or herself which pictures he or she actually wants to receive. Finally, the user may send this abstraction of the entire contents of a "roll" of film—a contact sheet file—via email by creating only one email attachment to the email message. This is true whether the contact sheet file is sent by email, or electronically by other Internet transport protocols, such as the file transfer protocol (FTP) and the hypertext transport protocol (HTTP). This is also true where the contact sheet file is sent by regular postal mail. Embodiments of the invention also may provide for other advantages not described here.

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

What is claimed is:

1. A digital camera comprising:
   a picture-taking mechanism to take pictures by generating image files corresponding to the pictures; and,
   a contact sheet generation mechanism to generate one or more contact sheet files, each contact sheet file including a plurality of thumbnail images, each thumbnail image corresponding to one of the image files,
   wherein the contact sheet generation mechanism, in response to determining that a current contact sheet file includes a maximum number of thumbnail images after adding an additional thumbnail image to the current contact sheet file, is to create a new contact sheet file and set the new contact sheet file as the current contact sheet file to which further thumbnail images are to be added.

2. The digital camera of claim 1, wherein the contact sheet generation mechanism dynamically generates the one or more contact sheet files as the pictures are taken by the picture-taking mechanism.

3. The digital camera of claim 2, wherein the contact sheet generation mechanism further dynamically updates the one or more contact sheet files as the image files are selectively deleted from the digital camera by a user of the digital camera, such that the contact sheet generation mechanism, in response to determining that one or more of the contact sheet files upon being updated includes one or more empty contact sheet files, is to delete the empty contact sheet files.

4. The digital camera of claim 1, wherein the contact sheet generation mechanism generates the one or more contact sheet files upon user command.

5. The digital camera of claim 1, wherein the contact sheet generation mechanism generates the one or more contact sheet flies when the image files are uploaded to another device.

6. The digital camera of claim 1, wherein each contact sheet file includes for each thumbnail image of the plurality of thumbnail images at least one of: a file name of the image file corresponding to the thumbnail image, a date the picture to which the image file corresponding to the thumbnail image corresponds was taken, identifying information of the digital camera, and user-supplied information regarding the picture to which the image file corresponding to the thumbnail image corresponds.

7. The digital camera of claim 1, wherein the image files are generated according to a file format, and the one or more contact sheet files are generated according to the file format.

8. The digital camera of claim 1, further comprising an uploading mechanism to selectively upload at least some of the image files and at least some of the one or more contact sheet files to another device.

9. A digital camera comprising:
 a picture-taking mechanism to take pictures by generating image files corresponding to the pictures; and,
 a contact sheet generation mechanism to generate one or more persistent additional image files, each additional image file including a plurality of reduced-in-size images, each reduced-in-size image corresponding to one of the image files generated by the picture-taking mechanism.
 wherein the contact sheet generation mechanism, in response to determining that a current persistent additional image file includes a maximum number of reduced-in-size images after adding an additional reduced-in-size image to the current persistent additional image file, is to create a new persistent additional image file and set the new persistent additional image file as the current persistent additional image file to which further reduced-in-size images are to be added.

10. The digital camera of claim 9, wherein each image file generated by the picture-taking mechanism and each persistent additional image file generated by the contact sheet generation mechanism has a same size.

11. The digital camera of claim 9, wherein the contact sheet generation mechanism dynamically generates the one or more persistent additional image files as the pictures are taken by the picture-taking mechanism.

12. The digital camera of claim 9, wherein the contact sheet generation mechanism generates the one or more persistent additional image files in response to an event.

13. The digital camera of claim 12, wherein the event comprises one of user command, and uploading of the image files to another device.

14. A digital camera comprising:
 means for generating image files corresponding to pictures taken by the digital camera; and,
 means for generating one or more contact sheet files, each contact sheet file including a plurality of thumbnail images, each thumbnail image corresponding to one of the image files,
 wherein the means for generating the one or more contact sheet files, in response to determining that a current contact sheet file includes a maximum number of thumbnail images after adding an additional thumbnail image to the current contact sheet file, is to create a new contact sheet file and set the new contact sheet file as the current contact sheet file to which further thumbnail images are to be added.

15. The digital camera of claim 14, wherein the means for generating the one or more contact sheet files further is for dynamically updating the one or more contact sheet files as the pictures are taken by the digital camera.

16. The digital camera of claim 14, wherein the means for generating the one or more contact sheet files further is for dynamically updating the one or more contact sheet files as at least some of the image files are deleted from the digital camera, such that the means for generating the one or more contact sheet files, in response to determining that one or more of the contact sheet files upon being updated includes one or more empty contact sheet files, is to delete the empty contact sheet files.

17. A method for performance by a digital camera comprising:
 generating image files corresponding to pictures taken with the digital camera;
 generating one or more contact sheet files, each contact sheet file including a plurality of thumbnail images, each thumbnail image corresponding to one of the image files;
 generating an additional image file corresponding to an additional picture taken with the digital camera;
 updating a contact sheet file of the one or more contact sheet tiles to include a thumbnail image corresponding to the additional image file;
 determining whether the current contact sheet file includes a maximum number of thumbnail images after including the thumbnail image corresponding to the additional image file;
 in response to determining that the current sheet file includes the maximum number of thumbnail images, creating a new contact sheet file; and
 setting the new contact sheet file as the current contact sheet file.

18. The method of claim 17, further comprising generating an additional image file and updating a current contact sheet file of the one or more contact sheet files to include a thumbnail image corresponding to the additional image file for each of an additional number of pictures taken with the digital camera.

19. A method for performance by a digital camera comprising:
 removing an indicated image file selected from a plurality of image files corresponding to pictures taken with the digital camera;
 updating one or more contact sheet files including the contact sheet file previously updated to remove a thumbnail image corresponding to the indicated image file from the one or more contact sheet files;
 determining whether the one or more contact sheet files as updated include one or more empty contact sheet files; and
 in response to determining that the one or more contact sheet files as updated include one or more empty contact sheet files, deleting at least one of the one or more empty contact sheet files.

20. A computer-readable medium having instructions stored thereon for execution by a digital camera comprising:
 a first set of instructions for generating first image files corresponding to pictures taken with the digital camera;
 a second set of instructions for generating one or more second image files, each second image file including a plurality of reduced-in-size images, each reduced-in-size image corresponding to one of the first image files,
 wherein the second set of instructions in response to determining that a current second image file includes a maximum number of reduced-in-size images after adding an additional reduced-in-sized image to the current second image file, is to create a new second image file and set the new second image file as the current second image file to which further reduced-in-size images are to be added.

21. The medium of claim 20, further comprising a third set of instructions for uploading the first image files and the one or more second image files to another device.

* * * * *

UNITED STATES PATENT AND TRADEMARK OFFICE
CERTIFICATE OF CORRECTION

PATENT NO. : 6,937,275 B2
APPLICATION NO. : 10/027687
DATED : August 30, 2005
INVENTOR(S) : Lainye E. Heiles et al.

It is certified that error appears in the above-identified patent and that said Letters Patent is hereby corrected as shown below:

Column 8, Claim 5, line 62, delete "flies" and insert therefor --files--

Column 10, Claim 17, line 14, delete "tiles" and insert therefor --files--

Column 10, Claim 20, line 56, after "instructions" insert --,--

Signed and Sealed this

Twelfth Day of December, 2006

JON W. DUDAS
*Director of the United States Patent and Trademark Office*